Patented June 23, 1931

1,811,600

UNITED STATES PATENT OFFICE

LOUIS OSCAR VAN STRAATEN, OF BIGGEKERKE, NETHERLANDS

PROCESS FOR PRODUCING CLICHÉS FOR TWO, THREE OR MORE COLOR PRINTS, LANTERN SLIDES, AND COLORED WINDOWS AND THE LIKE

No Drawing. Application filed August 29, 1930, Serial No. 478,786, and in the Netherlands September 6, 1929.

This invention relates to a process for producing clichés for two, three or more color prints, lantern slides and colored windows and the like. When clichés are made for these purposes, two or three or more separate photographs have to be taken with the employment respectively, for example of a green, violet or orange light filter, the filters being chosen in accordance with the color sensitivity of the light sensitive substance of the photographic plates used. The negatives obtained in this manner have always possessed considerable inherent faults in respect of the purpose for which they are intended, which have to be corrected in order that a natural reproduction of the original object may be obtained. For example, certain portions of the negatives are not sufficiently dense for requirements and have to be intensified. The method hitherto employed for this correction consists in retouching the negatives in such a manner that the faults are reduced as much as possible. When the negatives are used in conjunction with autotype or copper plate printing, the copper or metal plates obtained by means of these negatives have to be corrected by etching operation.

The described methods of correcting the negatives and printing plates involves the expenditure of a large amount of time and are difficult of accomplishment and unreliable. The correction of the negatives must be effected entirely by hand, which besides requiring a large amount of time requires great skill and is even then unreliable as the retouching operation is necessarily effected without any positive control and results in the density of the retouched portions being too great or too little. When metal plates obtained through the medium of the negatives are corrected, similar difficulties arise during the etching operation and in order to overcome these difficulties it is necessary to make frequent trial impressions from the plates in the different colors as the etching operations progress in order to judge the degree of correction effected by the etching.

The process according to this invention consists in producing in the known manner a first series of negatives with the employment of the above mentioned two or three or more color filters, for instance green, violet and orange, whilst at the same time a corresponding series of negative images are produced of a strip of paper bearing the primary colors, for instance blue, yellow and red, the said colors being those which are finally used in the printing operations.

Preferably each of the colors is provided upon the strip of paper shaded from dark to light.

In addition to the above mentioned negatives obtained with the color filters for instance green, violet and orange a second series of photographic negatives are produced whilst employing light filters of the corresponding complementary colors for example red, yellow and blue. From the latter negatives diapositives are made which have a density which corresponds to the inherent faults which are visible on the images of the strip of paper having the primary colors which appear on the first series of negatives. The shades of the primary colors on the strip of paper which is photographed at the same time as the object to be reproduced are of great assistance when judging the density of the images on the diapositives.

By placing each of the first mentioned negatives in contact with the corresponding diapositive to form a compound element in which the images coincide exactly, light which passes through the negatives with their inherent faults, is completely corrected by the said diapositives.

Compared with the relatively difficult and lengthy operation which is necessary with known processes, the process according to this invention has the advantage that the operation requires much less time to perform as the various photographs may be taken one directly after the other and the plates or films may be developed simultaneously, after which the diapositives may be made directly from the second series of negatives in the manner above described without any retouching operations.

Although the process according to this invention necessitates the use of relatively more sensitive plates or films than with known processes and consequently incurs relatively higher costs, these are plentifully compensated by the elimination of the employment of a skilled retouching operator or etcher and the accompanying expenses and further the correction obtained by the process according to this invention is complete and correct which can very seldom if ever be obtained by the known processes.

What I claim is:—

1. Process for producing clichés for two, three or more color prints, lantern slides, colored windows and the like which comprises producing a first series of two, three or more photographic negatives of an object with the employment of a corresponding number of different color filters (for example, green, violet and orange), simultaneously producing corresponding negative images of primary colors (for example, blue, yellow and red), producing a second series of photographic negatives of the said object with the employment of light filters of the corresponding complementary colors of the said primary colors (for example red, yellow and blue), producing a corresponding series of diapositives from the second series of negatives of a density which corresponds to the inherent faults of the first series of negatives as disclosed by the images of the three primary colors upon the first series of negatives, so placing each of the first series of negatives with relation to the corresponding diapositives that the images coincide exactly to form a compound element for the purpose set forth.

2. A process as claimed in claim 1, wherein the primary colors of which negative images are produced are shaded from dark to light.

In testimony whereof, I affix my signature.

LOUIS OSCAR van STRAATEN.